US010083127B2

(12) United States Patent
Khatib

(10) Patent No.: US 10,083,127 B2
(45) Date of Patent: Sep. 25, 2018

(54) SELF-ORDERING BUFFER

(71) Applicant: HGST Netherlands B.V., Amsterdam (NL)

(72) Inventor: Mohammed Ghiath Khatib, Santa Clara, CA (US)

(73) Assignee: HGST Netherlands B.V., Amsterdam (NL)

(*) Notice: Subject to any disclaimer, the term of this patent is extended or adjusted under 35 U.S.C. 154(b) by 109 days.

(21) Appl. No.: 15/243,727

(22) Filed: Aug. 22, 2016

(65) Prior Publication Data
US 2018/0052780 A1 Feb. 22, 2018

(51) Int. Cl.
*G06F 3/06* (2006.01)
*G06F 5/00* (2006.01)
*G06F 12/121* (2016.01)
*G06F 13/16* (2006.01)
*G06F 5/06* (2006.01)

(52) U.S. Cl.
CPC .......... *G06F 12/121* (2013.01); *G06F 3/0659* (2013.01); *G06F 5/065* (2013.01); *G06F 13/1673* (2013.01); *G06F 2212/69* (2013.01)

(58) Field of Classification Search
None
See application file for complete search history.

(56) References Cited

U.S. PATENT DOCUMENTS 5,706,443 A    1/1998  Brady et al.
5,974,483 A *  10/1999 Ray ........................... G06F 5/10
                                                    326/56
6,148,365 A *  11/2000 Buer ........................ G06F 5/10
                                                    710/53
6,246,682 B1   6/2001  Roy et al.
6,314,563 B1   11/2001 Agesen et al.
6,360,220 B1   3/2002  Forin
7,307,998 B1 * 12/2007 Wang ..................... H04L 49/90
                                                    370/412

(Continued)

FOREIGN PATENT DOCUMENTS

CN          101594299          6/2011

OTHER PUBLICATIONS

Deleting from a Linked List (Copyright 1993-2000), pp. 9.*

(Continued)

*Primary Examiner* — Kaushikkumar Patel
(74) *Attorney, Agent, or Firm* — Patent Law Works LLP

(57) ABSTRACT

Systems and methods for generating a self-ordering buffer are described. An example method includes generating a plurality of nodes forming a linked list, each node in the linked list having a directional pointer referencing a subsequent element in the linked list and a data pointer referencing a corresponding memory block from a plurality of memory blocks; generating a head pointer, the head pointer referencing a beginning node in the linked list; generating a tail pointer, the tail pointer referencing an end node in the linked list; generating a next pointer, the next pointer referencing a next node of the linked list; generating a free pointer, the free pointer referencing a free node of the linked list; and wherein the plurality of nodes forming the linked list, the corresponding memory blocks, the head pointer, the tail pointer, the next pointer, and the free pointer form a buffer.

23 Claims, 11 Drawing Sheets

(56) References Cited

U.S. PATENT DOCUMENTS

| | | | |
|---|---|---|---|
| 7,536,428 B2 * | 5/2009 | Erdogan | G06F 5/10 |
| 8,295,292 B2 | 10/2012 | Tse et al. | |
| 8,533,390 B2 * | 9/2013 | Dong | G06F 5/10 |
| | | | 711/110 |
| 8,904,067 B2 | 12/2014 | Saputra | |
| 2003/0088721 A1 | 5/2003 | Sharma | |
| 2004/0064430 A1 * | 4/2004 | Klein | G06F 17/3056 |
| 2004/0199732 A1 * | 10/2004 | Kelley | G06F 9/3814 |
| | | | 711/158 |
| 2006/0031643 A1 * | 2/2006 | Figueira | G06F 13/387 |
| | | | 711/154 |
| 2007/0169123 A1 * | 7/2007 | Hopkins | G06F 9/52 |
| | | | 718/100 |
| 2007/0230493 A1 * | 10/2007 | Dravida | H04L 47/14 |
| | | | 370/412 |
| 2007/0245074 A1 * | 10/2007 | Rosenbluth | G06F 5/10 |
| | | | 711/110 |
| 2009/0282181 A1 | 11/2009 | Castanha et al. | |
| 2011/0173399 A1 * | 7/2011 | Chen | G06F 11/348 |
| | | | 711/154 |
| 2013/0198480 A1 * | 8/2013 | Jones | G06F 9/5016 |
| | | | 711/170 |
| 2015/0012730 A1 | 1/2015 | Svendsen | |
| 2015/0026412 A1 * | 1/2015 | Eads | G06F 17/30902 |
| | | | 711/135 |

OTHER PUBLICATIONS

Data Structures (Aug. 12, 2911), pp. 18.*
Lock-Free Lists using Compare-and-Swap (ACM 0-89791-710-3/95/08), pp. 214-222.*
Wen Ren Chen "A Lock-Free Cache-Friendly Software Queue Buffer for Decoupled Software Pipelining" dated Aug. 12, 2015, 2 pages.

* cited by examiner

SELF-ORDERING BUFFER

BACKGROUND

Single-pointer first-in-first-out (FIFO) buffers are commonly used by software pipelines to read data into the buffer and write data back out of the buffer. Single-pointer FIFO buffers use a single data pointer to incrementally process data written into and read out of the FIFO buffer. Single-pointer FIFO buffers preserve the order of data stored in the buffer, however single-pointer FIFO buffers face issues of contention in multi-stage software pipelines, where racing conditions for data may be present. Single-pointer FIFO buffers are also under-utilized in out-of-order consumption patterns. Since single-pointer FIFO buffers incrementally step through the buffer using the pointer, a single-pointer FIFO buffer is unable to preserve the order in which data is read into the buffer, while also scanning the buffer for empty blocks when the pointer references a block in the buffer that still stores data for processing.

A common solution used to alleviate racing conditions is locking, where the buffer receives a request and initiates a lock while waiting for the output from one stage to be completed upon which the buffer unlocks and accepts new requests. However, while initiating locks into a buffer keeps the data in order and avoids corrupting the data as it is processed by different stages, the locks reduce the speed at which the buffer can process information. In an example of the second problem, data may be read out of the FIFO buffer at multiple stages in the same cycle and while data in an earlier stage is still being processed, data in a later stage is used and deleted, resulting in an empty stage in the FIFO buffer that cannot be reutilized until all the previous stages are also empty.

SUMMARY

According to one innovative aspect of the subject matter in this disclosure, a method includes generating a plurality of nodes forming a linked list, each node in the linked list having a directional pointer referencing a subsequent element in the linked list and a data pointer referencing a corresponding memory block from a plurality of memory blocks; generating a head pointer, the head pointer referencing a beginning node in the linked list; generating a tail pointer, the tail pointer referencing an end node in the linked list; generating a next pointer, the next pointer referencing a next node of the linked list; generating a free pointer, the free pointer referencing a free node of the linked list; and the plurality of nodes forming the linked list, the corresponding memory blocks, the head pointer, the tail pointer, the next pointer, and the free pointer form a buffer.

Other implementations of one or more of these aspects include corresponding systems, apparatus, and computer programs, configured to perform the actions of the methods, encoded on computer storage devices.

These techniques are particularly advantageous in a number of respects. For instance, the techniques described herein can be used to generate a buffer that reorders itself and facilitates immediate use of emerging vacancies while still remaining lockless. The techniques described herein enable higher throughput through less locking and contention for the buffer. The techniques described herein are more efficient at using resources compared to a single-pointer FIFO buffer, since emerging gaps are recycled and made useable quickly with low overhead.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation, in the figures of the accompanying drawings in which like reference numerals are used to refer to similar elements.

DETAILED DESCRIPTION

The present disclosure relates to methods and a data structure for a self-ordering buffer for software pipelines with out-of-order consumption patterns. As used herein, a buffer is a data structure that temporarily stores data being read in and out of a software pipeline. As used herein, a software pipeline is a series of stages that execute commands including to write, read, and/or delete data in the buffer. The disclosed self-ordering buffer allows the software pipeline to avoid instances in which a lock is placed on the buffer to process data, resulting in a buffer that allows processing of information more quickly than a first-in-first-out (FIFO) buffer employing locking mechanisms. Further, the self-ordering buffer efficiently uses memory space and processor capacity by writing data in and reading data out of the buffer in shorter processor times and incorporates out-of-order deletions in the memory by using pointers to monitor positions in the buffer where data can be read from and other positions in the buffer where data can be written. The self-ordering buffer appears to the software pipeline to be a simple FIFO buffer, while the self-ordering buffer avoids the issues of contention and out-of-order consumption (through deletion, for example) that a simple FIFO buffer encounters. The self-ordering buffer uses new methods for data insertion and deletion that allow out-of-order consumption of empty memory blocks in the buffer, while maintaining the appearance of a simple FIFO buffer to the software pipeline. In some implementations, the self-ordering buffer may be implemented by a single-producer (one write command stage), multi-reader (multiple read command stages), and multi-remover (multiple delete command stages) software pipeline system.

Figure 1:
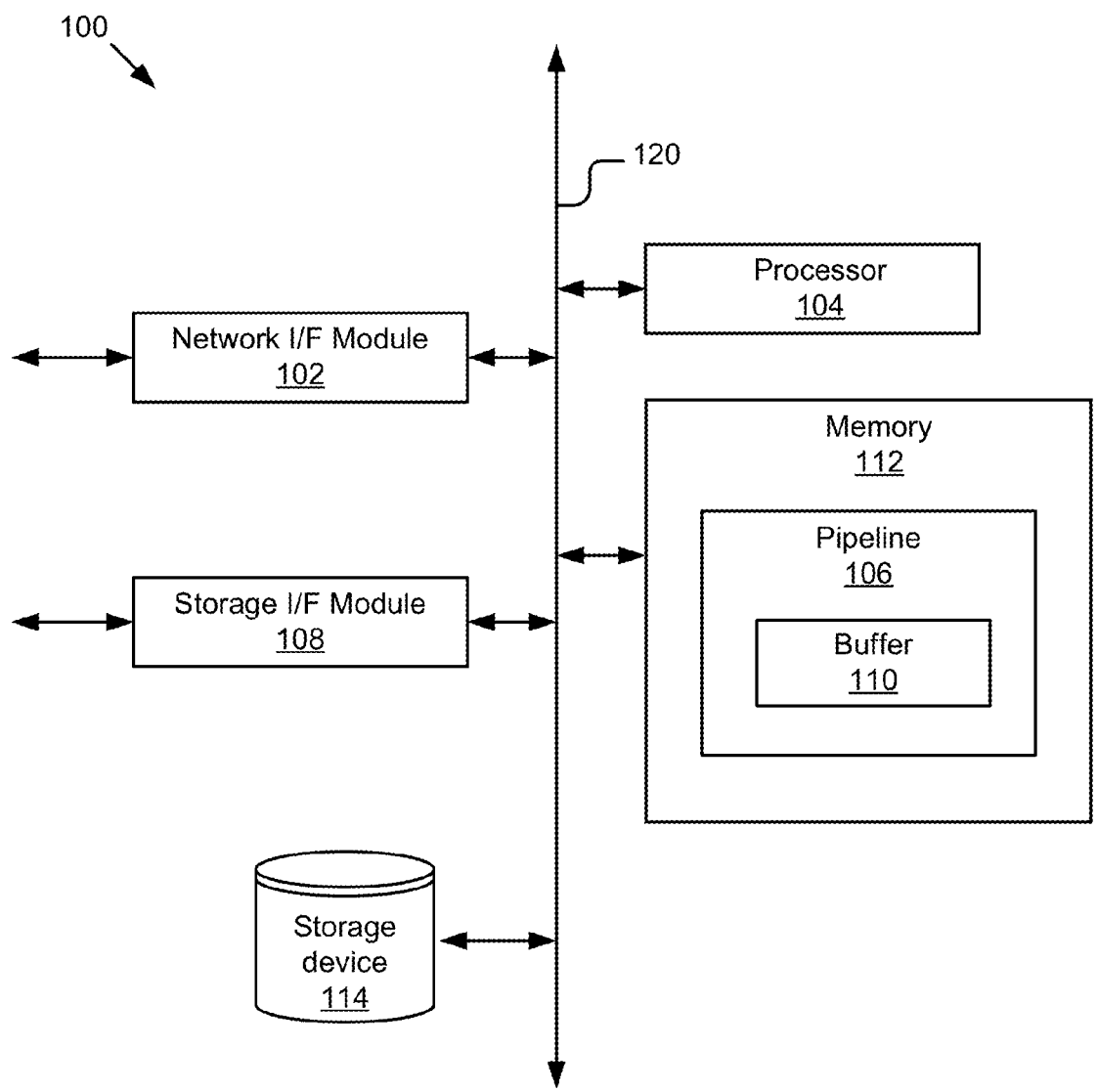
FIG. 1 is a block diagram illustrating an example system including a software pipeline and a self-ordering buffer.

FIG. 1 is a block diagram illustrating an example system including a software pipeline and a self-ordering buffer. In the depicted implementation, the system 100 may include a network interface (I/F) module 102, a processor 104, a software pipeline 106, a storage interface (I/F) module 108, a buffer 110, a memory 112, a storage device 114, and/or a bus or software communications mechanism 120. In the illustrated implementation, these different entities of the system 100 are communicatively coupled via the bus or software communications mechanism 120 for communication with each other. However, the present disclosure is not limited to this configuration, and a variety of different system environments may be employed and are within the scope of the present disclosure.

The network interface module 102 is configured to connect system 100 to a network and/or other system. For example, the network interface module 102 may enable communication through one or more of the Internet, cable networks, and wired networks. The network interface module 102 links the processor 104 to a network that may in turn be coupled to other processing systems. The network interface module 102 also provides other conventional connections to a network for distribution and/or retrieval of files and/or media objects using standard network protocols such as Transmission Control Protocol/Internet Protocol (TCP/IP), Hypertext Transfer Protocol (HTTP), Secure Hypertext Transfer Protocol (HTTPS), and Simple Mail Transfer Protocol (SMTP) as will be understood. In some implementations, the network interface module 102 includes a transceiver for sending and receiving signals using WiFi, Bluetooth® or cellular communications for wireless communication.

The processor 104 may include an arithmetic logic unit, a microprocessor, a general purpose controller or some other processor array to perform computations. In some implementations, the processor 104 is a hardware processor having one or more processing cores. The processor 104 is coupled to the bus or software communication mechanism 120 for communication with the other components of system 100. Although only a single processor is shown in the example of FIG. 1, multiple processors and/or processing cores may be included. It should be understood that other processor configurations are possible.

The memory 112 stores instructions and/or data that may be executed by the processor 104. In the illustrated implementation, the memory 112 includes a software pipeline 106 that additionally may include a buffer 110. The memory 112 is coupled to the bus or software communication mechanism 120 for communication with the other components of the system 100. The instructions and/or data stored in the memory 112 may include code for performing the techniques described herein.

The memory 112 may be, for example, a non-transitory storage device such as a dynamic random access memory (DRAM) device, a static random access memory (SRAM) device, flash memory or some other memory device. In some implementations, the memory 112 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or some other non-volatile storage device.

The software pipeline 106 may be software, code, logic, or routines for creating a software pipeline system comprising multiple stages that work concurrently on different data items. The stages of the software pipeline may read, write, and/or delete data stored within a buffer.

The software pipeline 106 includes buffer 110. The buffer 110 may be software, code, logic, or routines for creating a portion of memory 112 as a linked list of nodes that include pointers referencing memory blocks for processing data as described in more detail elsewhere herein. The buffer 110 may be configured to receive data from a stage of the software pipeline 106 and store that data in the buffer until another stage of the software pipeline 106 requests the data. The pointers may store values referencing addresses of nodes and/or memory blocks. The buffer 110 may allow different stages of the software pipeline 106 to access and modify the data stored in the memory blocks referenced by the nodes of the buffer 110.

The bus or software communication mechanism 120 may be an object bus (e.g., Common Object Request Broker Architecture (CORBA)), direct socket communication (e.g., TCP/IP sockets) among software modules, remote procedure calls, User Datagram Protocol (UDP) broadcasts and receipts, HTTP connections, function or procedure calls, etc. Further, any or all of the communication could be secure (Secure Shell (SSH), HTTPS, etc.). The bus or software communication mechanism 120 can be implemented on any underlying hardware, for example, a network, the Internet, a bus, a combination thereof, etc.

The storage device 114 may be any type of attached writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data to be processed by software pipeline 106.

It should be recognized that in the figures, inclusion of a letter after a reference number or numeral (for example, "202a") is a specific reference to the element or component that is designated by that particular reference numeral. In the event a reference numeral appears in the text without a letter following it (for example, "202"), it should be recognized that such is a general reference to different implementations of the element or component bearing that general reference numeral.

Figure 2:
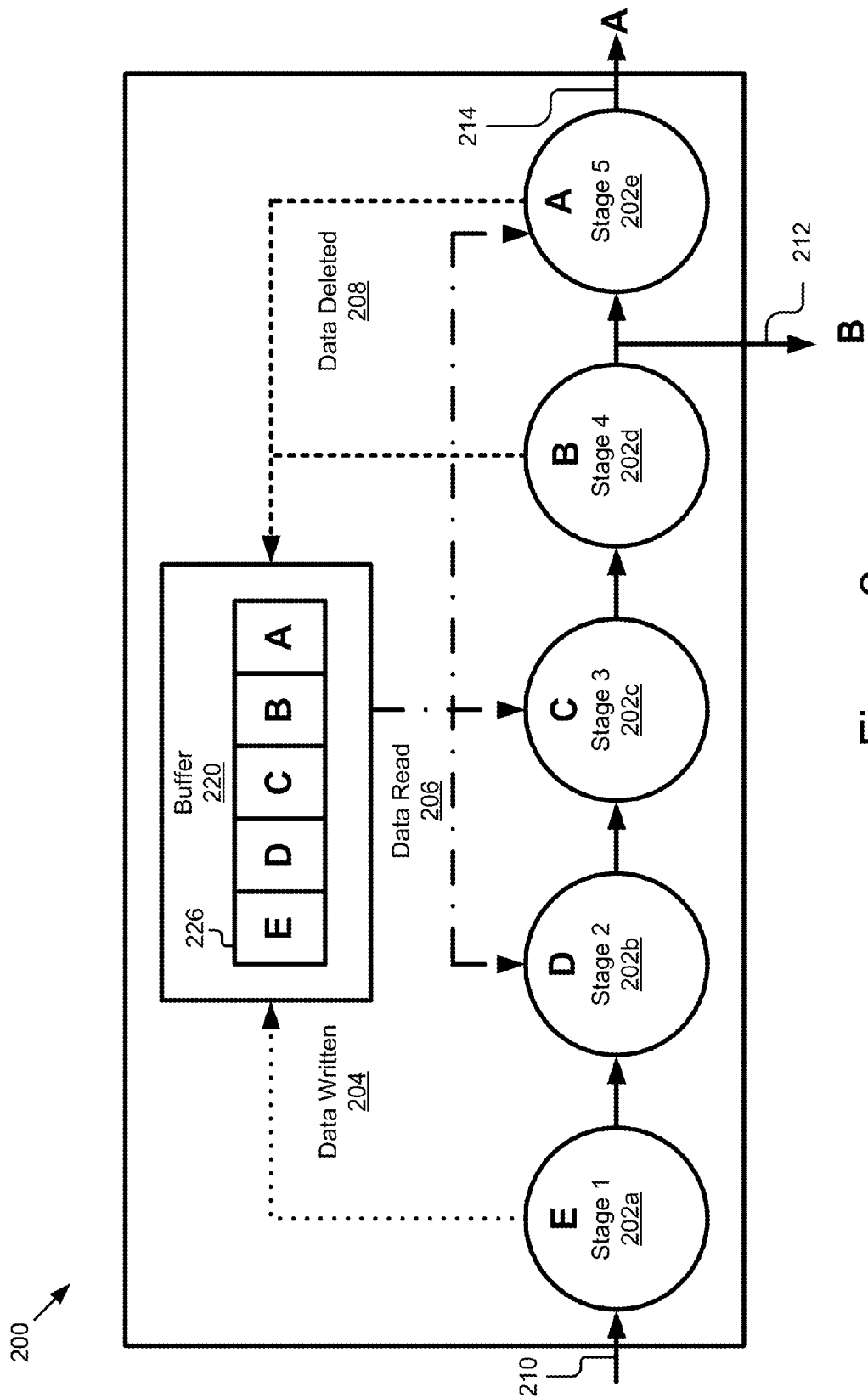
FIG. 2 is a block diagram illustrating an example software pipeline.

Referring now to FIG. 2, a block diagram of an example software pipeline system 200 with multiple stages is depicted. As depicted, the software pipeline 200 includes a buffer 220. The software pipeline 200 includes stages 202a-202e that access and modify data stored within the buffer 220. The software pipeline 200 is an example of a multi-stage software pipeline 200 using a simple FIFO buffer, in which data is input 210 into the software pipeline 200 and received at Stage 1 202a.

In the example of FIG. 2, a single write stage 202a is present. The write stage 202a uses a write command 204 to write the data received at the input 210 into the buffer 220. The buffer 220 maintains a FIFO ordering as data is written in from the input 210 using the write command 204.

One problem that often arises in a buffer for a software pipeline, such as buffer 220 as depicted in the example of FIG. 2, is contention. Contention occurs when data from the buffer 220 is being processed at one stage of the software pipeline 200, and that same data is requested (e.g., overwritten, deleted, modified, etc.) by another stage of the software pipeline 200. One solution to avoid contention is locking. Locking involves halting all future commands to the buffer 220 while data is being processed by a stage, preventing data from being requested until the commands are complete. However, locking is inefficient, since the buffer 220 must stop access to data until the stage of the software pipeline completes processing steps.

Figure 3:
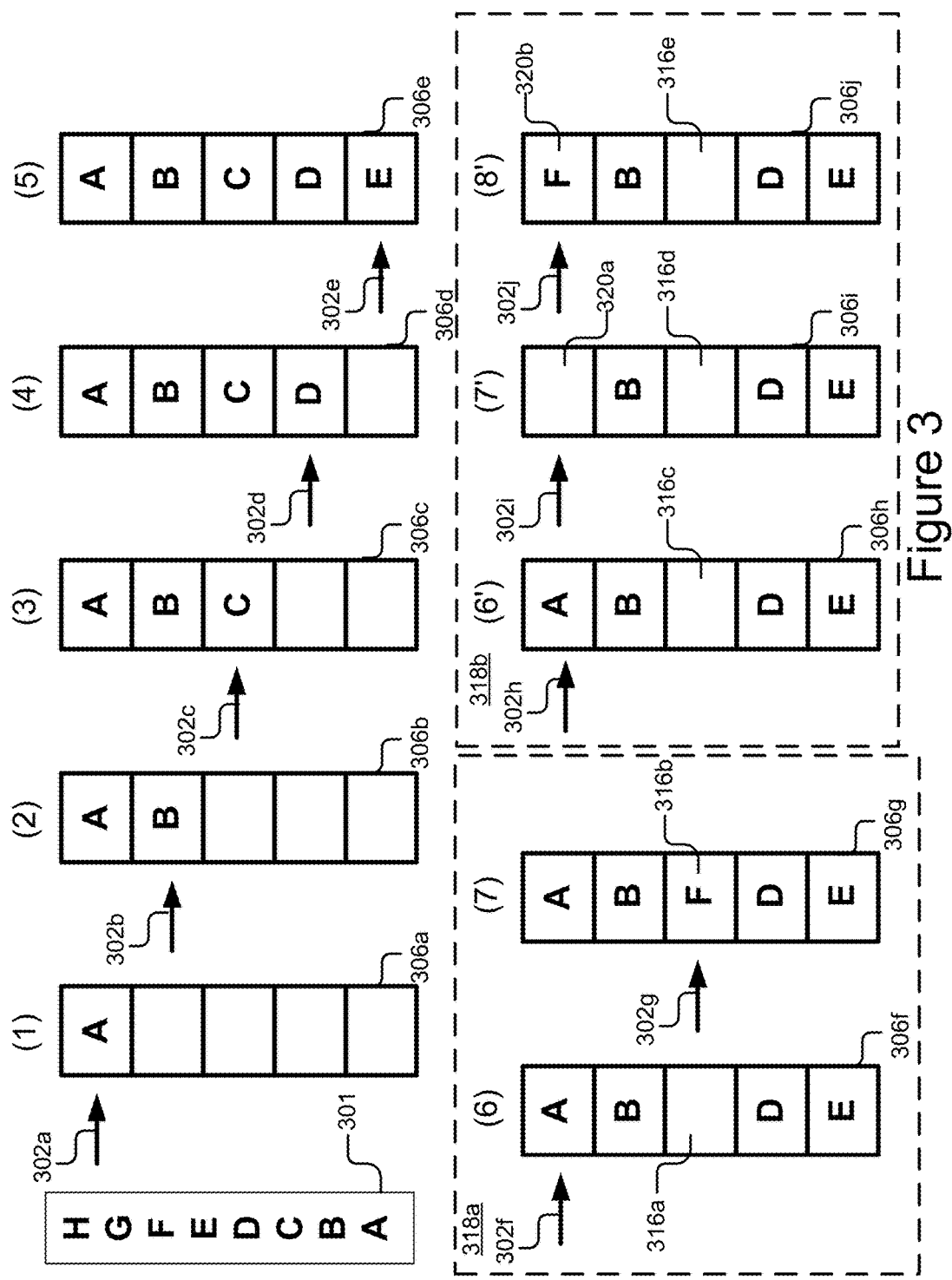
FIG. 3 is an example graphical representation illustrating a buffer and a sequence of example data.

FIG. 3 is an example graphical representation illustrating a buffer 306 and sequence of example data 301. The graphical representation includes data 301 that is written to the buffer 306 in various cycles. The example of FIG. 3 illustrates how the buffer 306 may be filled with the data 301 in sequence. A pointer 302 references a block in the buffer 306 and is incremented each cycle to point to the next block in the buffer 306. When the pointer 302 gets to the end of the buffer 306, the buffer moves back to the first block and continues to circularly step through the buffer 306, one block per cycle. As illustrated, data 301 is received in order at the buffer 306. Once the buffer 306 is full (e.g., at instance 5), a software pipeline state must wait until the first piece of data 'A' is processed and removed before the next piece of data 301 can be written to the buffer 306.

Further, the example of FIG. 3 illustrates an of out-of-order deletion 316 and two techniques to deal with out-of-order deletions 316. When an out-of-order deletion occurs (as represented by the empty block 316 where 'C' was previously stored) and the buffer 306 receives a write request, the buffer 306 scans for and fills the out-of-order deletion, as shown in the example 318a. The memory blocks in buffer 306g are scanned to locate the next empty space at 316b where data can be written to the buffer. The data 'F' is then written to the block 316b. While this scanning process allows empty blocks to be filled out of order, utilizing the memory space more efficiently, the scanning process also increases the processing time of reading data 301 into the buffer 306 since the order of the pointer 302g may be incremented multiple times as the pointer 302 scans to find the empty block 316. Further, the order of data in the buffer is not preserved, making indexing and locating data burdensome.

Alternatively, the buffer 306 preserves the order of data and continues to increment until the empty buffer slot is referenced, as shown in the example 318b. The example 318b illustrates the buffer 306 preserving the order of the data as written to the buffer, rather than utilizing an empty block from an out-of-order deletion. Buffer 306h includes an empty block 316c, where data 'C' was removed out-of-order. The pointer 302h is pointing to the first block in the buffer 306h. In buffer 306i, the data 'A' is processed and removed from the block 320a. In buffer 306j, the next set of data 'F' is written to the empty block 320b, while block 316e (caused by an out-of-order deletion) remains empty and unutilized until the pointer 302 is incremented to block 316e. This technique preserves the order that data 301 is written to and read from the buffer 306, however empty space is under-utilized because of out-of-order deletions. As illustrated above, the problems that result from single-pointer FIFO buffers include contention issues and out-of-order deletion.

Figure 4:
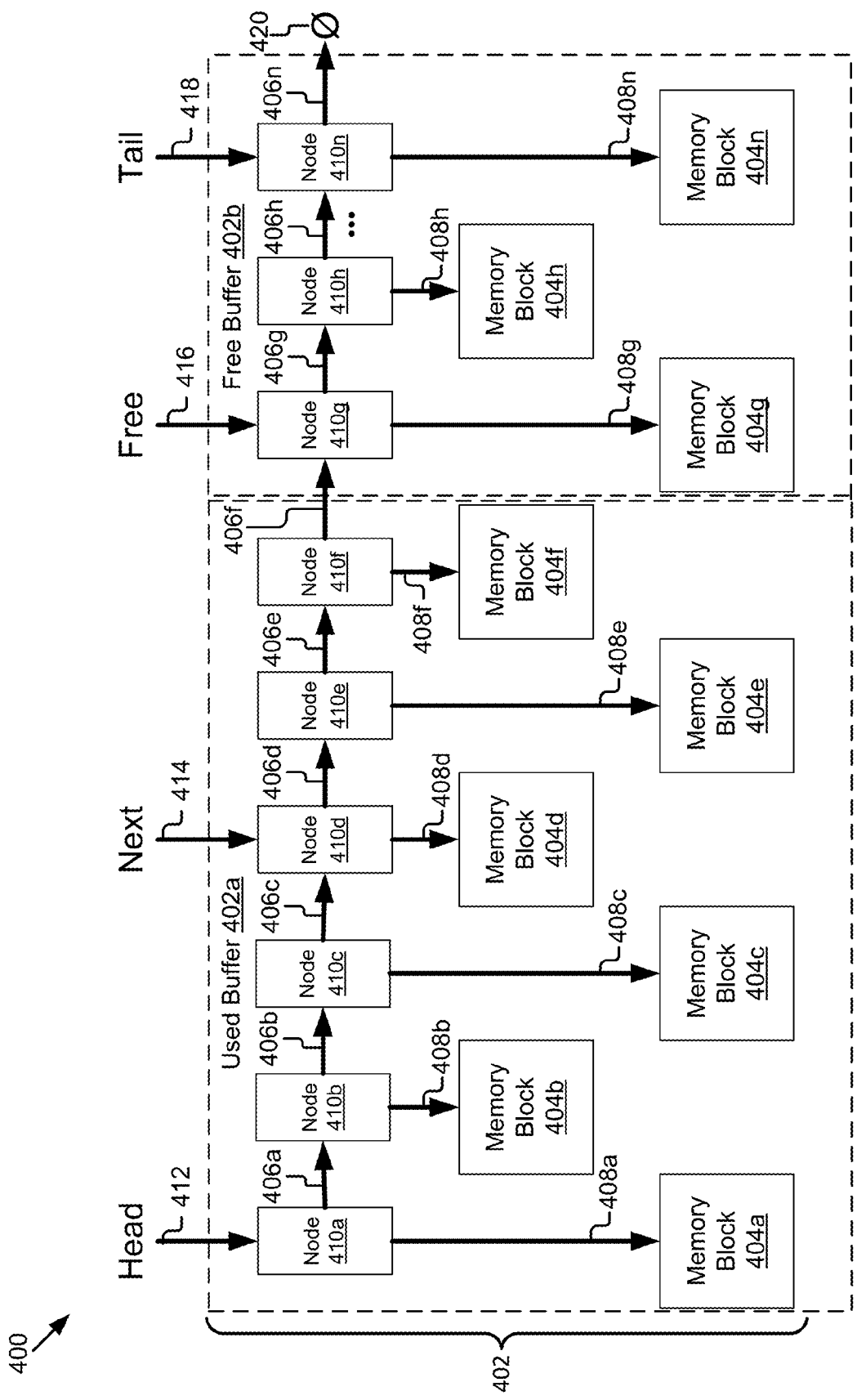
FIG. 4 is a block diagram illustrating an example data structure for a self-ordering buffer according to the techniques introduced herein.

FIG. 4 is a block diagram illustrating an example data structure 400 for a self-ordering buffer according to the techniques introduced herein. The buffer 402 includes a linked-list of nodes 410 and memory blocks 404 that are linked by pointers in the buffer 402. Directional pointers 406 are included in the linked-list of nodes 410 and reference subsequent nodes. For example, in the buffer 402, node 410a includes a directional pointer 406a that references a subsequent node 410b. The buffer 402 also includes data pointers 408 that reference from nodes 410 to corresponding memory blocks 404. For example, node 410a includes a data pointer 408a that references memory block 404a.

The buffer 402 includes a head pointer 412 that references a beginning node 410a in the buffer 402. The buffer 402 includes a tail pointer 418 that references an end node 410n in the buffer 402. The end node 410n includes a directional pointer 406n that references a null indicator 420, rather than a subsequent node. The null indicator 420 signifies the end of the buffer 402. The buffer 402 includes a next pointer 414 that references the next node 410 in the buffer 402 from which data stored in the corresponding memory block 404 will be processed. In the example of FIG. 4, the next pointer 414 references the node 410d, and the data stored in the memory block 404d will be the next data read out of the buffer 402 for processing. The buffer 402 includes a free pointer 416 that references a free node including a data pointer 408 that references the corresponding memory block 404 to which the next set of data will be written to the buffer 402. In the example of FIG. 4, the free pointer 416 references node 410g, and the data written to the buffer 402 will be stored in memory block 404g. By moving the next pointer 414 and free pointer 416 to reference different nodes 410 in the buffer 402 as data is manipulated, the buffer 402 may be able to perform functions such as reading data, writing data, and/or removing data as described with reference to FIGS. 5-7.

By utilizing a linked list of nodes 410 and the pointers, the buffer 402 is able to preserve the order of data in the buffer and utilize memory blocks freed by out-of-order deletions. For example, in the buffer 402, empty memory blocks are filled in order using the next pointer 414 and free pointer 416, allowing the buffer 402 to operate more efficiently by using memory blocks as they become available without having to search for the empty memory blocks.

Portions of the buffer 402 can also be referred to herein as a used buffer 402a and a free buffer 402b. The used buffer includes nodes in the buffer 402 that are currently storing data in their associated memory blocks. The used buffer 402a includes the nodes from the beginning node to the node that includes a directional pointer 406 that references the node referenced by the free pointer 416. For example, referring to the example of FIG. 4, the used buffer 402a extends from the beginning node 410a to the node 410f, which includes a directional pointer 406f that references the node 410g referenced by the free pointer 416. The free buffer 402b includes nodes, and corresponding memory blocks, from the node referenced by the free pointer 416 (e.g., node 410g) to the node referenced by the tail pointer 418 (e.g., node 410n). In some implementations, when the buffer is full or empty, the used buffer 402a or the free buffer 402b includes the entire buffer 402.

If the free pointer 416 and the head pointer 412 reference the same node 410, then an empty condition is true. If the free pointer 416 references the null indicator 420, then a full condition is true. If the next pointer 414 references any node between the node referenced by the head pointer 412 and a node that includes a directional pointer referencing the node referenced by the free pointer 416, an available condition is true. The available condition indicates that the buffer includes data and can be processed or read. If the next pointer 414 references the same node referenced by the free pointer 416, then no data is available for reading or processing. If the head pointer 412 references the same node as the tail pointer 418, then a last memory block condition is true. The last memory block condition indicates a single memory block is available to be written to.

Figure 5:
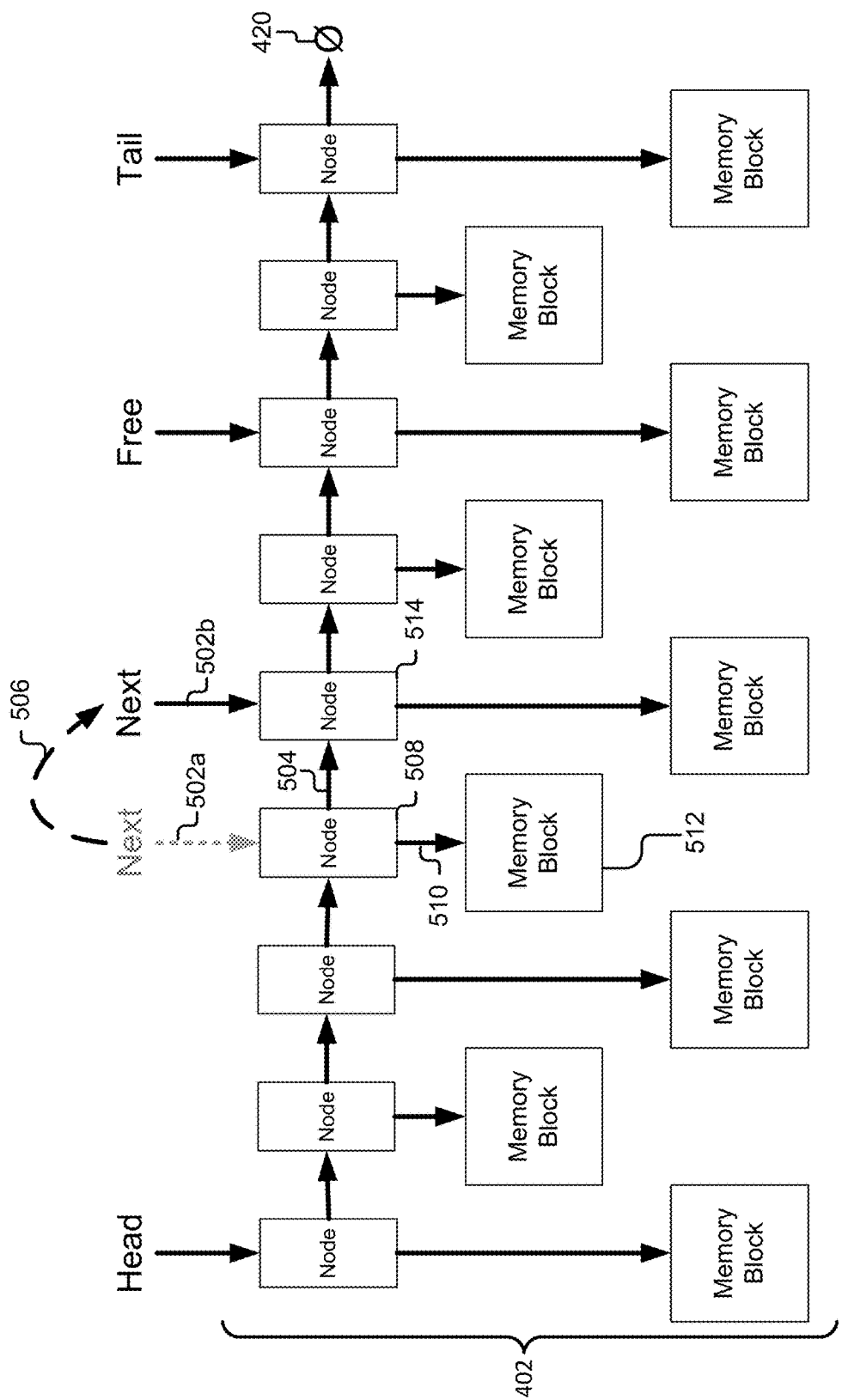
FIG. 5 is a block diagram illustrating a read command according to the techniques disclosed herein.

FIG. 5 is a block diagram illustrating a read command according to the techniques disclosed herein. In the example of FIG. 5, data is read from the buffer 402. The read command includes identifying a node 508 that is referenced by the next pointer 502a. The node 508 includes a directional pointer 504 referencing a subsequent node 514. The read command may be from a stage of a software pipeline, such as the stages described in FIG. 2. The stage in some implementations either may receive data from the buffer or may receive information on how to access the data from the buffer (e.g., receive a data pointer referencing a memory block storing the data). In one implementation, the data pointer 510 of the node 508 is used to fetch the data from the memory block 512 that the data pointer 510 references, and the data is returned to the stage that initiated the read command. In other implementations, the data pointer 510 is returned to the stage that initiated the read command, and the stage uses the data pointer 510 to access the data stored in the memory block 512. The read command also increments 506 the next pointer 502b to reference the next node 514 in the linked list of nodes. In some implementations, the increment 506 may happen by assigning the reference value of the directional pointer 504 to the next pointer 502b, resulting in the next pointer 502b referencing the subsequent node 514 referenced by the directional pointer 504. The read command allows the next pointer to reference subsequent nodes in the linked list and fetch the data from the buffer while preserving the order of the buffer, essentially mimicking a FIFO buffer.

Locking is not required when the read command is executed, since reading inherently does not modify any data in the buffer. In some implementations, implementing inter-operation lockless schemes may be achieved by having the read commands operate by using the data pointer to the memory block, rather than the node. Using the data pointer to the memory block (moving the node around in the linked list during delete commands) preserves the data referenced by the node both before and after the node is moved. In some implementations, inter-operation lockless schemes may also allow multiple reads to be performed concurrently at different memory blocks by different stages.

Figure 6:
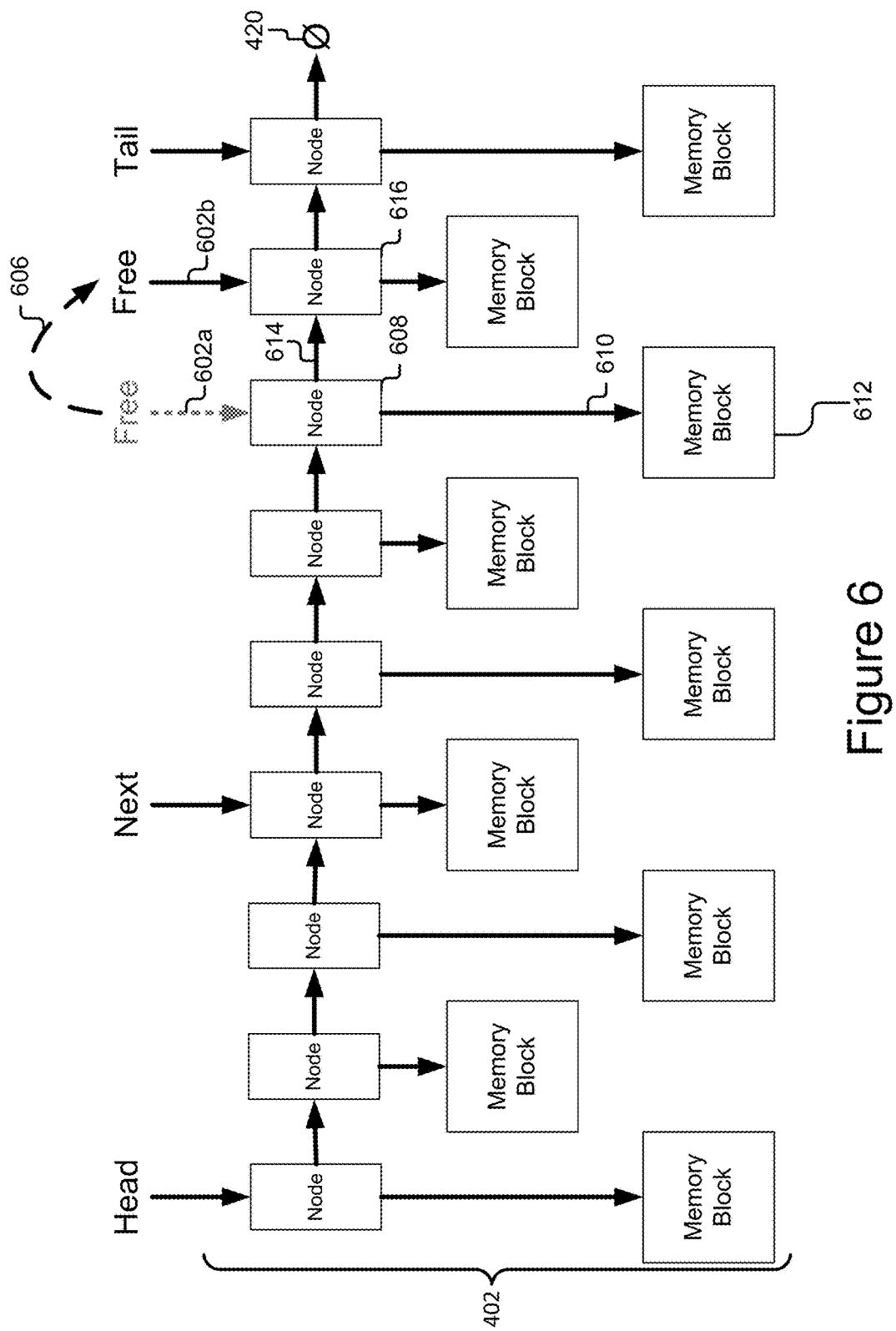
FIG. 6 is a block diagram illustrating a write command according to the techniques introduced herein.

FIG. 6 is a block diagram illustrating a write command according to the techniques introduced herein. In the example of FIG. 6, data is written to the buffer 402. The write command includes identifying a node 608 that is referenced by the free pointer 602a. The node 608 includes a directional pointer 614 referencing a subsequent node 616 and a data pointer 610 referencing a memory block 612. The write command may be from a stage of a software pipeline, such as the stages described in FIG. 2. The stage receives data as an input and writes the data to a memory block 612 referenced by a data pointer 610 included in the node 608 referenced by the free pointer 602a. In some implementations, the buffer 402 may write data to the memory block 612 referenced by the data pointer 610. After writing the data, the buffer 402 increments 606 the free pointer 602b to reference the subsequent node 616 in the linked list of nodes. In some implementations, the buffer increments 606 the pointer 602b by assigning the reference value of the directional pointer 614 to the free pointer 602b. Thus, the free pointer 602 is incremented through the linked list of nodes, to continuously reference the next empty memory block in the buffer 402 without having to scan the buffer for an empty block like a simple FIFO buffer and also preserving the order in which data is written into the buffer 402.

In some implementations, if the buffer 402 determines that the full condition is true, the buffer 402 may wait to write the data until a memory block has been cleared.

Figure 7:
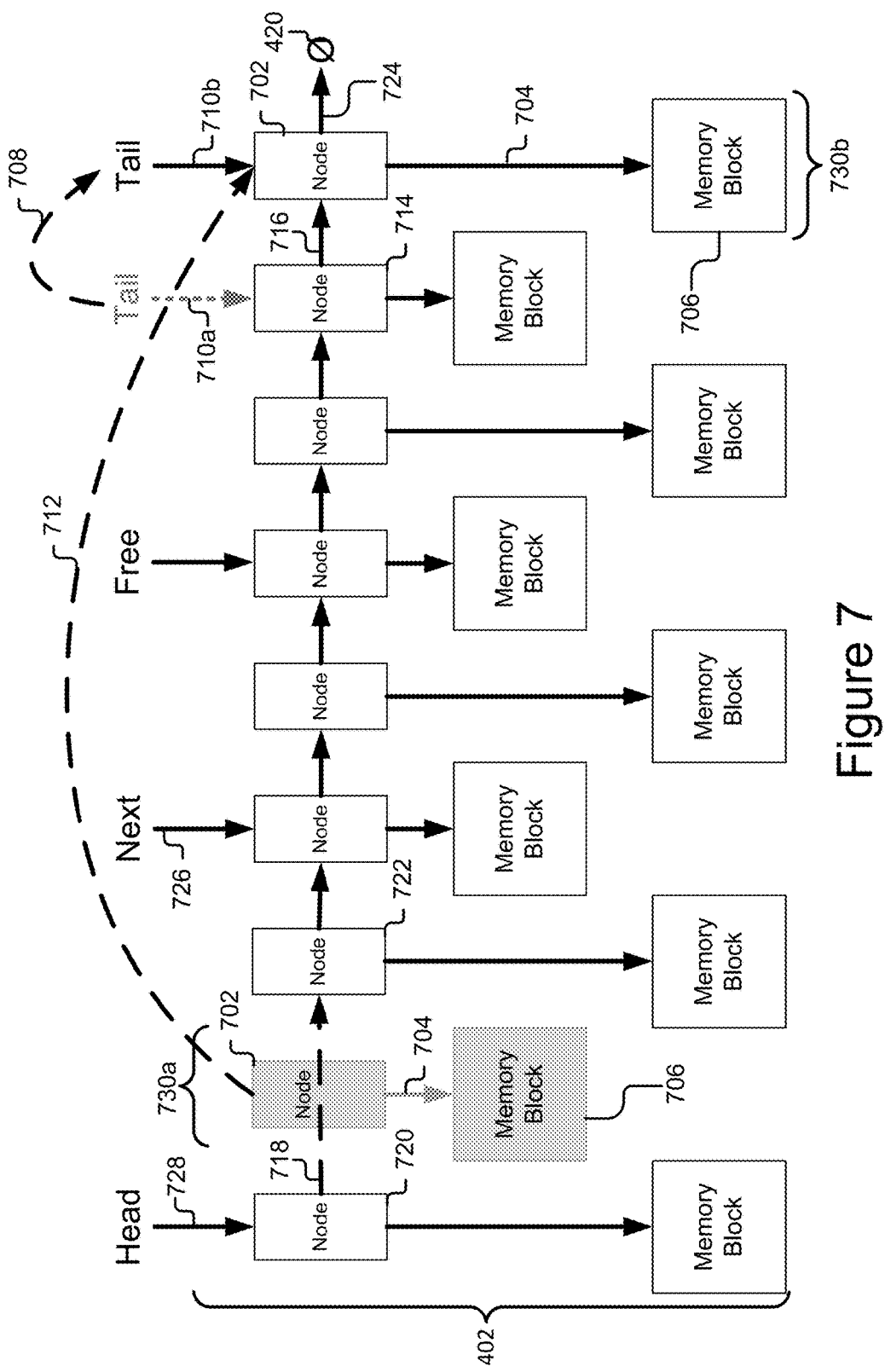
FIG. 7 is a block diagram illustrating a delete command according to the techniques introduced herein.

FIG. 7 is a block diagram illustrating a delete command according to the techniques introduced herein. In the example of FIG. 7, data is deleted or removed from the buffer 402. The buffer receives a delete command from a stage of the software pipeline 106 to delete data included in a memory block that the stage has determined is ready for deletion. The buffer 402 may then identify the node 702, at position 730a in the linked list of nodes, that includes a data pointer 704 referencing a memory block 706 marked for deletion. The buffer 402 may then disconnect the node 702 from the linked list of nodes and assign the data pointer 718 of the prior node 720 to reference the subsequent node 722 in order to connect the prior node 720 and the subsequent node 722 in the linked list of nodes. The disconnected node 702 may then be appended 712 to the end of the linked list of nodes at position 730b, after the node 714, referenced by the position of the tail pointer 710a. The directional pointer 716 included in the node 714 may then be assigned to reference the appended node 702, and the directional pointer 724 included in the appended node 702 may be assigned to reference the null indicator 420. The buffer 402 may then increment 708 the tail pointer 710b to reference the appended node 702, at position 730b. By appending the node 702 to the end of the linked list, the buffer 402 is able to maintain the ordering of the remaining data in the buffer 402, while also utilizing a memory block 706 freed by an out-of-order deletion, whereas a simple FIFO buffer is unable to both preserve the order of the data and utilize free memory blocks as a result of out-of-order deletions.

While the commands described above with reference to FIGS. 5-7 may be performed simultaneously on the self-ordering buffer without locking the buffer, in some implementations, the self-ordering buffer may perform a locking function when simultaneous delete commands are received from different stages. When simultaneous delete commands are received, the locking function may lock the buffer from further changes until the delete commands have been completed to prevent the operation of one delete command from manipulating the data of the other delete command. However, it is to be understood that multiple delete commands may be executed by the buffer 402 without locking the buffer in some implementations If the next pointer 726 and/or the head pointer 728 reference the node 702 referencing the memory block 706 to be deleted, then the buffer 402 may increment the next pointer 726 and/or the head pointer 728 to reference a subsequent node in the linked list of nodes.

Figure 8:
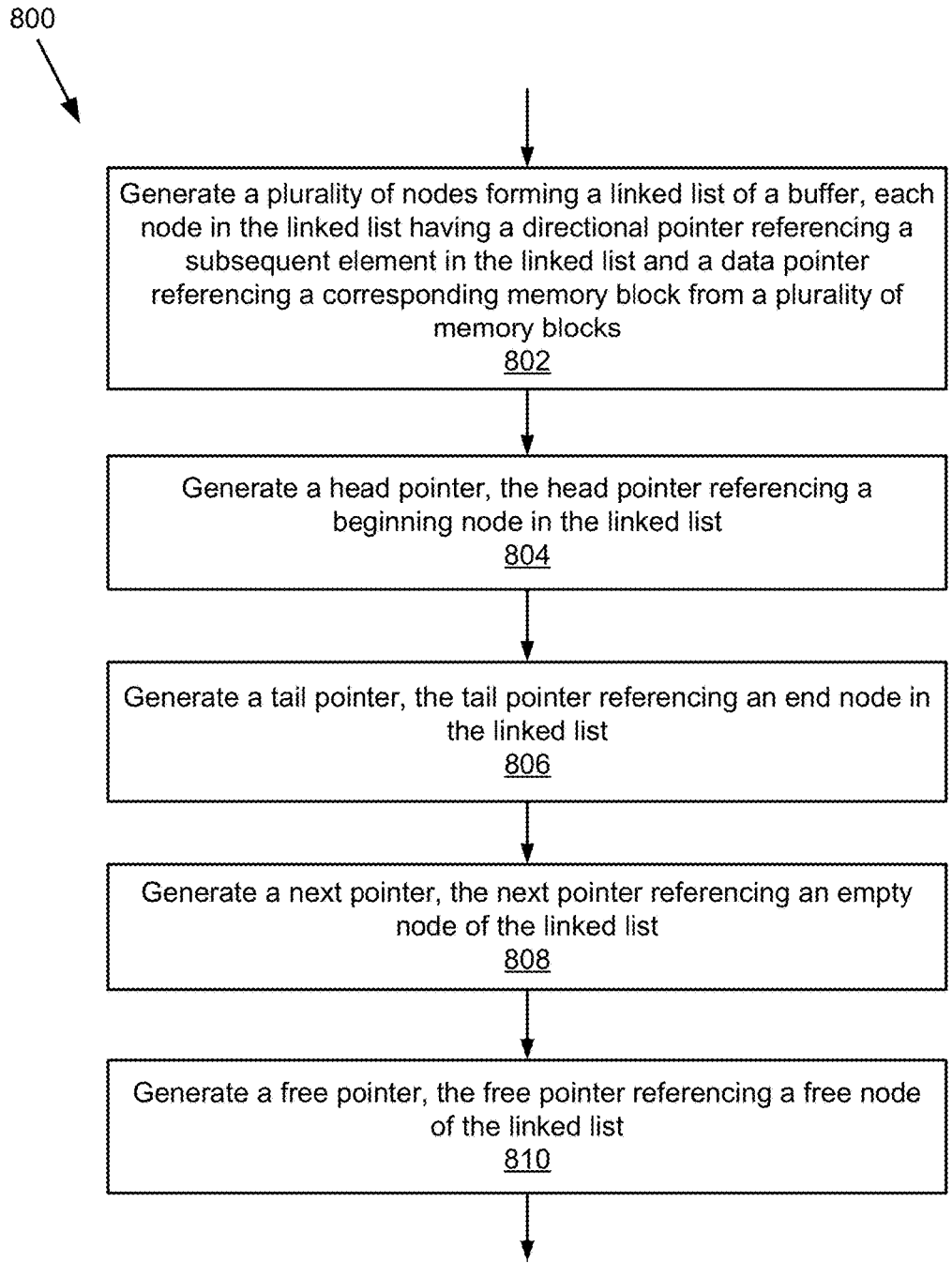
FIG. 8 is a flowchart of an example method for implementing a buffer according to the techniques introduced herein.

FIG. 8 is a flowchart of an example method for implementing a buffer according to the techniques introduced herein. The method 800 begins at 802 with the buffer 402 generating a plurality of nodes 410 forming a linked list. For example, the plurality of nodes 410 may be located in an allocated portion of memory 112 capable of being referenced by pointers. Nodes in the linked list may include directional pointers 406 referencing subsequent elements in the linked list. The elements referenced by the directional pointers 406 may include subsequent nodes 410 or a null indicator 420. Nodes in the linked list may also include a data pointer 408 referencing a corresponding memory block 404 from a plurality of memory blocks 404. For example, the data pointers 408 may be stored in the memory 112 at the location of the node 410, and the data pointer 408 may be an address for a separate location in memory 112 where data may be written and modified. At 804, the buffer 402 may generate a head pointer 412, the head pointer 412 referencing a beginning node 410a in the linked list. The head pointer may be generated as a portion of memory 112 that stores an address of the location of the beginning node 410a. At 806, the buffer 402 may generate a tail pointer 418, the tail pointer 418 referencing an end node 410n in the linked list. The tail pointer may be generated as a portion of memory 112 that stores an address of the location of the end node 410n. At 808, the buffer 402 may generate a next pointer 414, the next pointer 414 referencing an empty node 410 in the linked list that references a memory block 404 from which data will be read. The next pointer may be generated as a portion of memory 112 that stores an address of the location of a node 410 that the next pointer references. At 810, the buffer 402 may generate a free pointer 416, the free pointer 416 referencing a node 410 of the linked list that references a memory block 404 to which data will be written. The free pointer may be generated as a portion of memory 112 that stores an address of the location of a node 410 in the linked list that the free pointer references.

Figure 9:
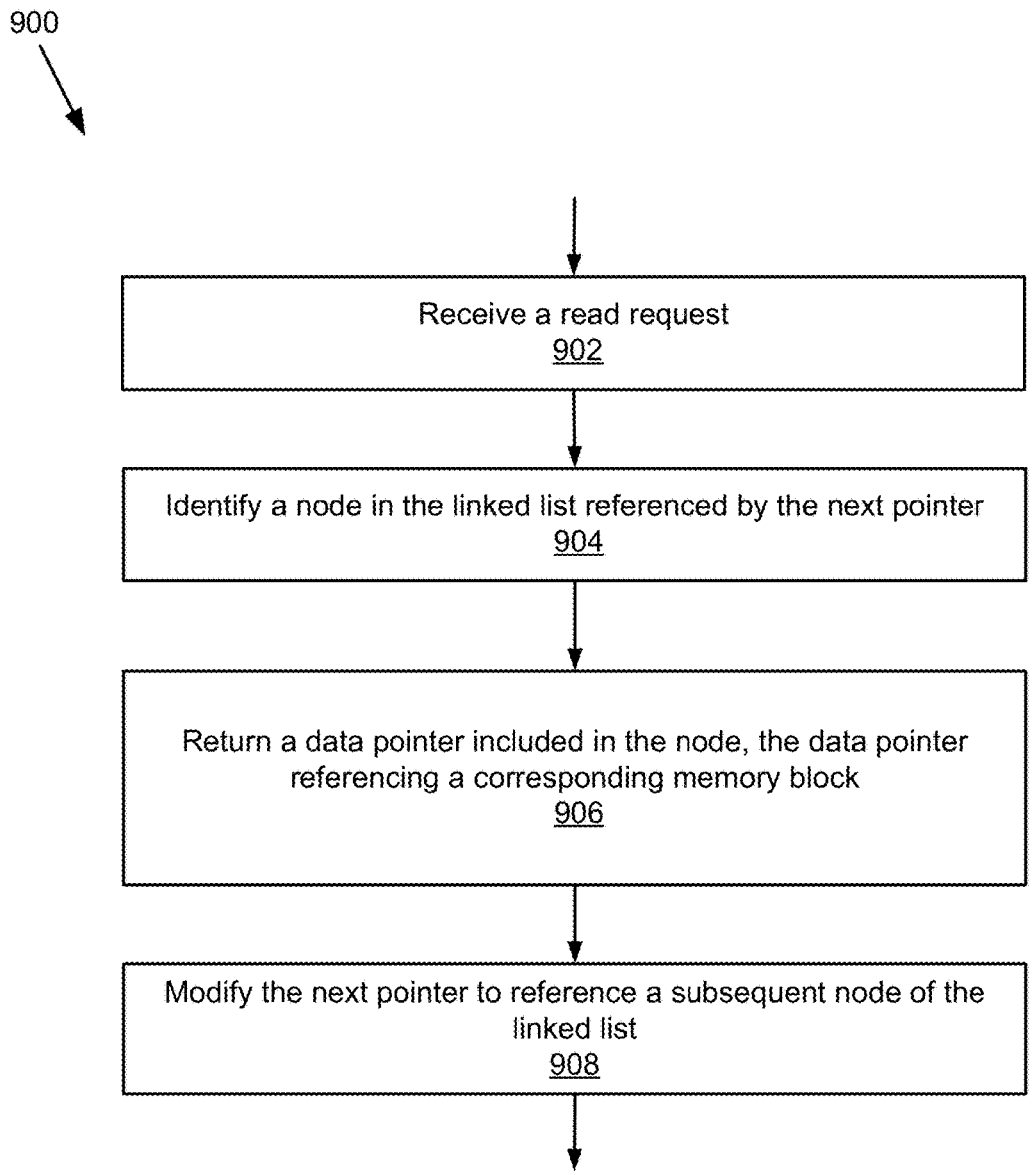
FIG. 9 is a flowchart of an example method for executing a read command on a buffer according to the techniques disclosed herein.

FIG. 9 is a flowchart of an example method for executing a read command on a buffer, such as the example buffer 402 depicted with reference to FIG. 5. The method 900 begins at 902 where the buffer 402 receives a read request from a stage of the software pipeline 106. At 904, the buffer 402 may identify a node in the linked list referenced by the next pointer 502a. At 906, the buffer 402 may return a data pointer 510 included in the node referenced by the next pointer 502a to the stage of the software pipeline 106, and the stage may use the data pointer 510 to access the data stored in the memory block 512. In other implementations, the buffer 402 may return the data stored in the memory block 512 to the stage rather than the data pointer 510 referencing the memory block 512. At 908, the buffer 402 may modify the next pointer by incrementing 506 the next pointer 502b to reference a subsequent node of the linked list.

Figure 10:
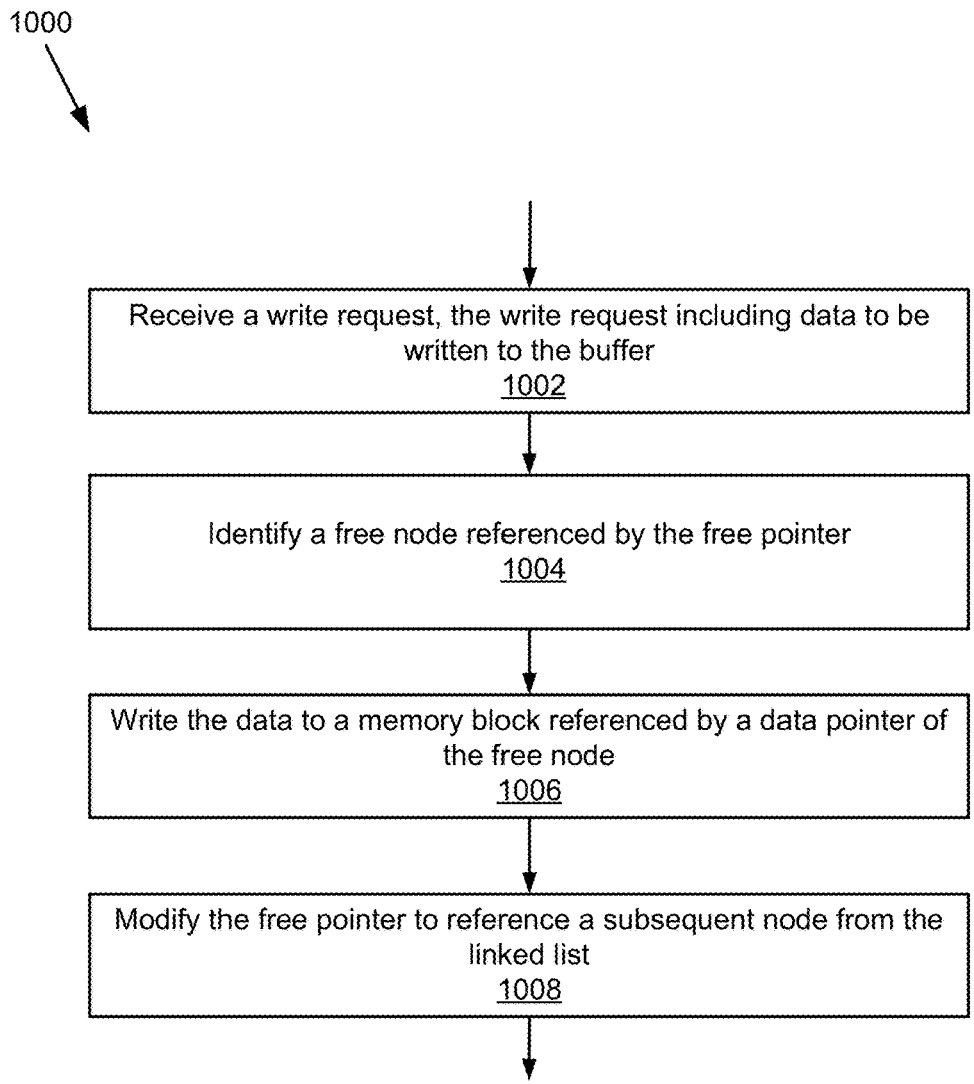
FIG. 10 is a flowchart of an example method for executing a write command on a buffer according to the techniques disclosed herein.

FIG. 10 is a flowchart of an example method for executing a write command on a buffer, such as the example buffer 402 depicted with reference to FIG. 6. The method 1000 begins at 1002 where the buffer 402 receives a write request from a stage of the software pipeline 106. The write request includes data to be written to the buffer 402. At 1004, the buffer 402 may identify a free node referenced by the free pointer 602a. At 1006, the buffer 402 may write the data to a memory block 612 referenced by a data pointer 610 of the free node. In other implementations, the buffer 402 may return the data pointer 610 to the stage that requested the write command, and the stage may write the data into the memory block 612 referenced by the data pointer 610. At 1008, the buffer 402 may modify the free pointer by incrementing 606 the free pointer 602b to reference a subsequent node from the linked list.

Figure 11:
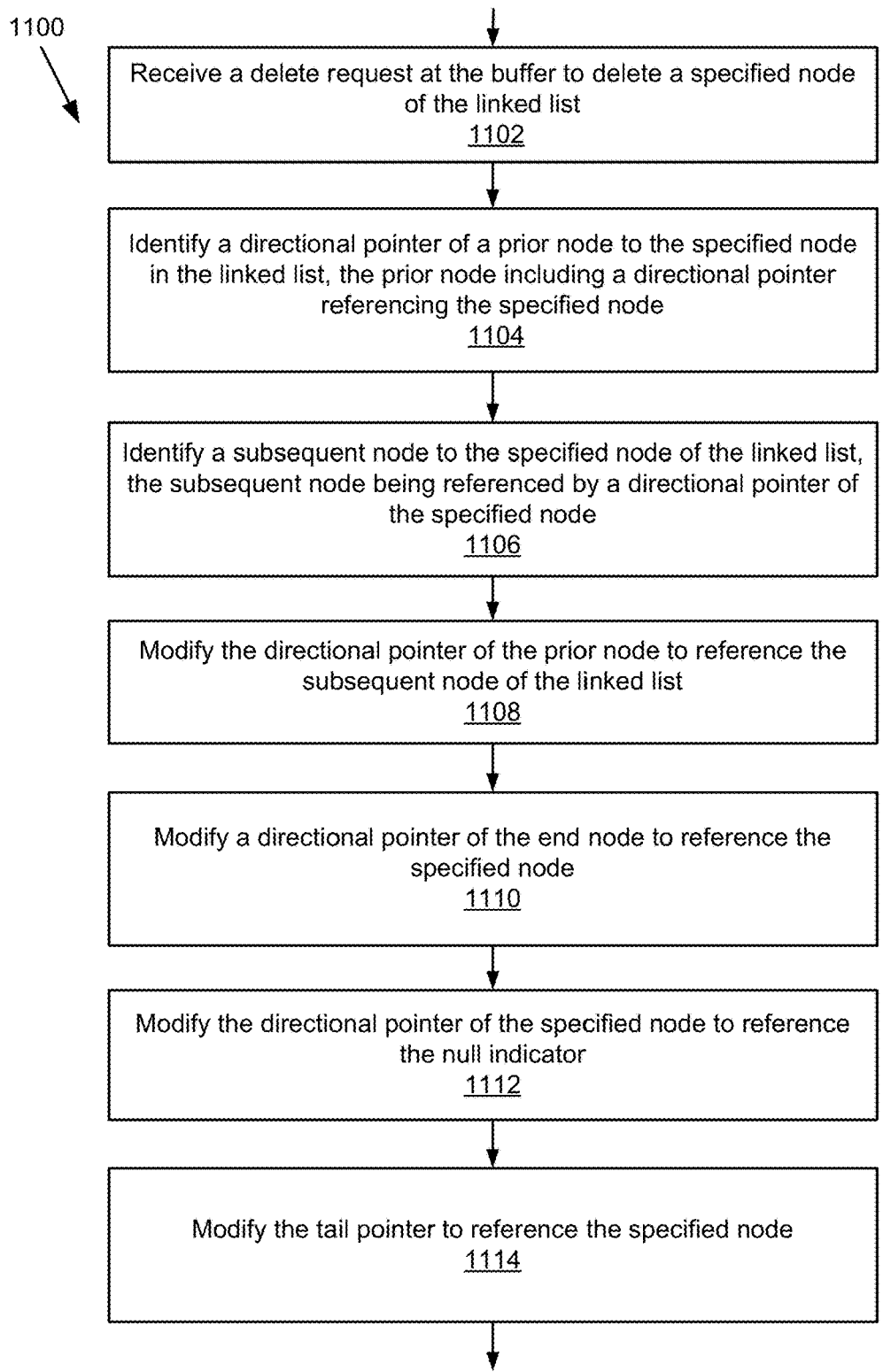
FIG. 11 is a flowchart of an example method for executing a delete command on a buffer according to the techniques disclosed herein.

FIG. 11 is a flowchart of an example method for executing a delete command on a buffer, such as the example buffer 402 depicted with reference to FIG. 7. The method 1100 begins at 1102 where the buffer 402 receives a delete request from a stage of the software pipeline 106 to delete a specified node 702 of the linked list. At 1104, the buffer 402 may identify a directional pointer 718 of a prior node 720 relative to the specified node 702 in the linked list, the prior node 720 including a directional pointer 718 referencing the specified node 702. At 1106, the buffer 402 may identify a subsequent node 722 relative to the specified node 702 of the linked list, the subsequent node being referenced by a directional pointer of the specified node. At 1108, the buffer 402 may modify the directional pointer 718 of the prior node 720 to reference the subsequent node 722 of the linked list. At 1110, the buffer 402 may modify a directional pointer 716 of the end node to reference the specified node 702. At 1112, the buffer 402 assigns the directional pointer 724 of the specified node 702 to reference the null indicator 420. At 1114, the buffer 402 may modify the tail pointer 710b to reference the specified node 702.

Systems, methods, and structures for generating a self-ordering buffer have been described. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), Erasable Programmable Read-Only Memories (EPROMs), Electrically Erasable Programmable Read-Only Memories (EEPROMs), magnetic or optical cards, flash memories including Universal Serial Bus (USB) keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementations in any specific programming language, or for any specific operating system or environment. Accordingly, the disclosure of the present techniques and technologies is intended to be illustrative, but not limiting.

What is claimed is:

1. A method comprising:
generating a plurality of nodes forming a linked list, each node in the linked list having a directional pointer referencing a subsequent node in the linked list and a data pointer referencing a corresponding memory block from a plurality of memory blocks;
generating a head pointer, the head pointer referencing a beginning node in the linked list;
generating a tail pointer, the tail pointer referencing an end node in the linked list;
generating a next pointer, the next pointer referencing a next node of the linked list; and
generating a free pointer, the free pointer referencing a free node of the linked list,
wherein the plurality of nodes forming the linked list, the corresponding memory blocks, the head pointer, the tail pointer, the next pointer, and the free pointer form a buffer,
wherein the buffer is a self-ordering buffer capable of maintaining an order while a read request, a write request, and a delete request are executed simultaneously and utilizing free memory blocks as a result of out of order deletions.

2. The method of claim 1, further comprising:
receiving the read request;
identifying the next node of the linked list referenced by the next pointer;
returning data stored in a memory block referenced by the data pointer of the next node; and
modifying the next pointer to reference a subsequent node of the linked list.

3. The method of claim 1, further comprising:
receiving the write request, the write request including data to be written to the buffer;
identifying the free node referenced by the free pointer;
writing the data to a memory block referenced by a data pointer of the free node; and
modifying the free pointer to reference a subsequent node from the linked list.

4. The method of claim 1, further comprising:
receiving the delete request to delete data, the data being stored in a memory block and the memory block being referenced by a data pointer included in a specific node of the linked list; and
moving the specific node to a free section of the linked list.

5. The method of claim 4, wherein moving the specific node to a free section of the linked list comprises:
identifying a directional pointer of a prior node to the specific node in the linked list, the prior node including a directional pointer referencing the specific node;

identifying a subsequent node to the specific node of the linked list, the subsequent node being referenced by a directional pointer of the specific node;

modifying the directional pointer of the prior node to reference the subsequent node of the linked list;

modifying a directional pointer of the end node to reference the specific node;

modifying the directional pointer of the specific node to reference a null indicator; and modifying the tail pointer to reference the specific node.

6. The method of claim 5, further comprising:

applying a deletion lock to the buffer in response to receiving two or more simultaneous delete requests; and removing the deletion lock from the buffer upon completion of the delete requests.

7. The method of claim 1, wherein the buffer is a part of a single-producer, multi-reader, and multi-remover software pipeline system.

8. The method of claim 1, further comprising:

receiving simultaneous commands at different nodes in the linked list, the commands including one or more of the read request, the write request, and the delete request.

9. The method of claim 1, further comprising:

determining that two or more of the head pointer, the tail pointer, the free pointer, and the next pointer reference a common node of the linked list; and providing an indication to the buffer in response to that determination.

10. A system comprising:

a processor; and a memory storing instructions that, when executed by the processor, cause the system to:

generate a plurality of nodes forming a linked list, each node in the linked list having a directional pointer referencing a subsequent node in the linked list and a data pointer referencing a corresponding memory block from a plurality of memory blocks;

generate a head pointer, the head pointer referencing a beginning node in the linked list;

generate a tail pointer, the tail pointer referencing an end node in the linked list;

generate a next pointer, the next pointer referencing a next node of the linked list; and generate a free pointer, the free pointer referencing a free node of the linked list, wherein the plurality of nodes forming the linked list, the corresponding memory blocks, the head pointer, the tail pointer, the next pointer, and the free pointer form a buffer, wherein the buffer is a self-ordering buffer capable of maintaining an order while a read request, a write request, and a delete request are executed simultaneously and utilizing free memory blocks as a result of out of order deletions.

11. The system of claim 10, wherein the instructions, when executed, further cause the system to:

receive the read request;

identify the next node of the linked list referenced by the next pointer;

return data stored in a memory block referenced by the data pointer of the next node; and modify the next pointer to reference a subsequent node of the linked list.

12. The system of claim 10, wherein the instructions, when executed, further cause the system to:

receive the write request, the write request including data to be written to the buffer;

identify the free node referenced by the free pointer;

write the data to a memory block referenced by a data pointer of the free node; and modify the free pointer to reference a subsequent node from the linked list.

13. The system of claim 10, wherein the instructions, when executed, further cause the system to:

receive the delete request to delete data, the data being stored in a memory block and the memory block being referenced by a data pointer included in a specific node of the linked list; and move the specific node to a free section of the linked list.

14. The system of claim 13, wherein the instruction to move the specific node to a free section of the linked list causes the system to:

identify a directional pointer of a prior node to the specific node in the linked list, the prior node including a directional pointer referencing the specific node;

identify a subsequent node to the specific node of the linked list, the subsequent node being referenced by a directional pointer of the specific node;

modify the directional pointer of the prior node to reference the subsequent node of the linked list;

modify a directional pointer of the end node to reference the specific node;

modify the directional pointer of the specific node to reference a null indicator; and modify the tail pointer to reference the specific node.

15. The system of claim 10, wherein the buffer is a part of a single-producer, multi-reader, and multi-remover software pipeline system.

16. The system of claim 10, wherein the instructions, when executed, further cause the system to:

receive simultaneous commands at different nodes in the linked list, the commands including one or more of the read request, the write request, and the delete request.

17. A computer program product comprising a non-transitory computer useable medium including a computer readable program, wherein the computer readable program when executed on a computer causes the computer to:

generate a plurality of nodes forming a linked list, each node in the linked list having a directional pointer referencing a subsequent node in the linked list and a data pointer referencing a corresponding memory block from a plurality of memory blocks;

generate a head pointer, the head pointer referencing a beginning node in the linked list;

generate a tail pointer, the tail pointer referencing an end node in the linked list;

generate a next pointer, the next pointer referencing a next node of the linked list; and generate a free pointer, the free pointer referencing a free node of the linked list, wherein the plurality of nodes forming the linked list, the corresponding memory blocks, the head pointer, the tail pointer, the next pointer, and the free pointer form a buffer, wherein the buffer is a self-ordering buffer capable of maintaining an order while a read request, a write request, and a delete request are executed simultaneously and utilizing free memory blocks as a result of out of order deletions.

18. The computer program product of claim 17, wherein the computer readable program, when executed on a computer, further causes the computer to:

receive the read request;

identify the next node of the linked list referenced by the next pointer;

return data stored in a memory block referenced by the data pointer of the next node; and modify the next pointer to reference a subsequent node of the linked list.

19. The computer program product of claim 17, wherein the computer readable program, when executed on a computer, further causes the computer to:

receive the write request, the write request including data to be written to the buffer;

identify the free node referenced by the free pointer;

write the data to a memory block referenced by a data pointer of the free node; and modify the free pointer to reference a subsequent node from the linked list.

20. The computer program product of claim 17, wherein the computer readable program, when executed on a computer, further causes the computer to:

receive the delete request to delete data, the data being stored in a memory block and the memory block being referenced by a data pointer included in a specific node of the linked list; and move the specific node to a free section of the linked list.

21. The computer program product of claim 20, wherein the computer readable program, when executed on a computer, causes the computer to:

identify a directional pointer of a prior node to the specific node in the linked list, the prior node including a directional pointer referencing the specific node;

identify a subsequent node to the specific node of the linked list, the subsequent node being referenced by a directional pointer of the specific node;

modify the directional pointer of the prior node to reference the subsequent node of the linked list;

modify a directional pointer of the end node to reference the specific node;

modify the directional pointer of the specific node to reference a null indicator; and modify the tail pointer to reference the specific node.

22. The computer program product of claim 17, wherein the buffer is a part of a single-producer, multi-reader, and multi-remover software pipeline system.

23. The computer program product of claim 17, wherein the computer readable program, when executed on a computer, further causes the computer to:

receive simultaneous commands at different nodes in the linked list, the commands including one or more of the read request, the write request, and the delete request.

* * * * *